United States Patent [19]

Cornelius et al.

[11] 4,066,799

[45] Jan. 3, 1978

[54] SODIUM CHLORIDE FLAVOR SUBSTITUTE COMPOSITION AND USE THEREOF

[75] Inventors: Dennis Alfred Cornelius; Nancy Jane Eberts, both of Elkhart; Moshe M. Sternberg, South Bend, all of Ind.

[73] Assignee: Miles Laboratories, Inc., Elkhart, Ind.

[21] Appl. No.: 733,156

[22] Filed: Oct. 18, 1976

Related U.S. Application Data

[63] Continuation-in-part of Ser. No. 643,016, Dec. 22, 1975, abandoned.

[51] Int. Cl.² .............................................. A23L 1/237
[52] U.S. Cl. ..................................... 426/534; 426/649
[58] Field of Search ................................ 426/649, 534

[56] References Cited

U.S. PATENT DOCUMENTS

| 2,829,056 | 4/1958 | Kemmerer | 426/649 |
| 3,039,880 | 6/1962 | Kawamura | 426/649 |
| 3,782,974 | 1/1974 | Lontz et al. | 426/649 |

OTHER PUBLICATIONS

Crosby et al., Dietary Evaluation of Synthetic Amino Acid Amides, J. Food Science, 29, No. 5, pp. 686–689 (1964).

*Primary Examiner*—Joseph M. Golian
*Attorney, Agent, or Firm*—Louis E. Davidson

[57] ABSTRACT

A sodium chloride substitute composition having a desirable saline flavor and being free of sodium or having a reduced sodium content is disclosed as consisting essentially of a mixture of a glycinamide salt and a flavor potentiator. The use of a glycinamide salt to impart a desirable saline flavor note to foodstuffs is also disclosed.

11 Claims, No Drawings

SODIUM CHLORIDE FLAVOR SUBSTITUTE COMPOSITION AND USE THEREOF

This application is a continuation-in-part of Ser. No. 643,016, filed Dec. 22, 1975 now abandoned.

BACKGROUND AND PRIOR ART

It is commonly known to add salt (sodium chloride) to foodstuffs to impart a desirable saline flavor note to such foodstuffs. However, certain individuals should, for medical reasons, restrict their intake of sodium. This occurs in the treatment and regulation of congestive heart failure, hypertension, certain types of kidney disease, advanced cirrhosis of the liver and during pregnancy. The typical recommended procedure to restrict intake of sodium is by reduction in or elimination of sodium chloride being employed for flavor purposes. The result is that the foodstuffs have an undesirable bland flavor.

Various compositions have been suggested in the prior art for providing salt substitutes. These are compositions which are free of sodium or have reduced sodium content. These compositions frequently consisted of mixtures of potassium chloride and/or ammonium chloride alone or with materials such as lactose, dextrose and cream of tartar. Mixtures of carboxylic acids have also been suggested. Typical prior art references are U.S. Pat. Nos. 2,601,112, 2,742,366, 2,806,793, 2,824,008, 2,829,056, 2,910,369, 2,966,416, 2,968,566, 3,505,082, 3,514,296, Re. 27,981, 3,782,974, 3,782,975 and 3,860,732. These prior art salt substitutes have not been entirely successful for several reasons. First, compositions containing significant amounts of potassium compounds can have their own undesirable medical aspects. Second, the compositions may have undesirable flavor notes in addition to the desirable saline flavor note. It was also known in the prior art that valinamide hydrochloride has a saline flavor. This is disclosed in J. Food Science 29 N. 5, pp. 686-9 (1964). However, this compound has been found to have an undesirable slightly bitter note in addition to being slightly saline.

SUMMARY OF THE INVENTION

In accordance with the present invention, a sodium chloride substitute composition having a desirable saline flavor is provided consisting essentially of a mixture of a glycinamide salt and a flavor potentiator. The invention also includes a process for using a glycinamide salt composition to impart a desirable saline flavor note to a foodstuff and a foodstuff containing an effective amount of such composition.

DESCRIPTION OF THE INVENTION

The glycinamide salts used in the present invention are either commercially available or can be readily produced by well-known techniques at a purity acceptable for use in foodstuffs. Such salts are, for example, glycinamide hydrochloride, sulfate, glutamate, citrate, malate, adipate, tartrate, fumarate, phosphate and ascorbate.

The flavor potentiator used in admixture with the glycinamide salt can be any well-known compound typically used as a flavor potentiator. Mixtures of such flavor potentiators can also be employed. Such materials can be glutamic acid, salts of glutamic acid, such as the alkali metal and ammonium glutamates, salts of 5'-nucleotides, such as sodium 5'-inosinate and sodium 5'-guanylate, and mixtures of glutamic acid salts or potassium chloride with food acidulants, such as fumaric acid, glutamic acid, citric acid, malic acid, tartaric acid, adipic acid and ascorbic acid. Typically useful flavor potentiators are monosodium glutamate and a mixture of sodium 5'-inosinate and sodium 5'-guanylate. Sodium chloride can also be used as a flavor potentiator. Mixtures of glycinamide salt and sodium chloride can be used wherein the total sodium content is reduced as compared to use of sodium chloride alone.

While the sodium chloride substitute composition can by a glycinamide salt alone, it preferably contains from about 20 to about 91 weight percent glycinamide salt and from about 9 to about 80 weight percent flavor potentiator, said weight percents being based on the total weight of such composition.

In the use of the glycinamide salt composition to impart a desirable saline flavor to a foodstuff, the glycinamide salt is added to the foodstuff in sufficient amount to effectively produce the desired flavor note. It has been found that from about 0.1 to about 4.0 weight percent, based on weight of the foodstuff, of a glycinamide salt or of a mixture of a glycinamide salt and a flavor potentiator is sufficient to produce the desired saline flavor note in the foodstuff. This favorably compares to the prior art use of about 0.1 to 4.0 weight percent sodium chloride to achieve the desired saline flavor note but with an undesirably high sodium level.

The invention will be described in further detail in the following examples.

EXAMPLE 1

A mixture of 86 weight percent glycinamide hydrochloride and 14 weight percent of a mixture of equal weight parts of sodium 5'-inosinate and sodium 5'-guanylate was added to raw hamburger meat at a level of 0.8 weight percent. After shaping and frying, the taste of the cooked hamburgers was similar to hamburgers prepared with a substantially equal amount of sodium chloride.

EXAMPLE 2

A mixture of 50 weight percent glycinamide hydrochloride and 50 weight percent monosodium glutamate was added to raw hamburger meat at a level of 1.4 weight percent. After shaping and frying, the taste of the cooked hamburgers was similar to hamburgers prepared with a substantially equal amount of sodium chloride.

EXAMPLE 3

A salt substitute mixture of 51 weight percent glycinamide hydrochloride and 49 weight percent monosodium glutamate (89 weight parts of such mixture) was mixed with 5 weight parts black pepper, 3 weight parts onion powder, 2 weight parts garlic powder and 1 weight part celery powder to form a flavoring composition that was used for flavoring foods and also to impart a desirable saline flavor note.

EXAMPLE 4

A salt substitute mixture of 67 weight percent glycinamide hydrochloride and 33 weight percent monosodium glutamate (75 weight parts of such mixture) was mixed with 25 weight parts beef flavored hydrolyzed vegetable protein to form a flavoring composition that was used for flavoring foods and also to impart a desirable saline flavor note.

EXAMPLE 5

A mixture of 91 weight percent glycinamide hydrochloride and 9 weight percent of a mixture of equal weight parts of sodium 5'-inosinate and sodium 5'-guanylate was added to a vegetable protein meat analog at a level of 1.1 weight percent. The taste of this analog was similar to that obtained with 1 weight percent sodium chloride.

The effectiveness of the glycinamide hydrochloride as compared to related compositions is shown in the following example.

EXAMPLE 6

Individual mixtures were prepared consisting respectively of 75 weight percent of the hydrochloride salt of one of the amino acid amides listed in Table I below and 25 weight percent monosodium glutamate. These mixtures were each blended into separate portions of ground beef at a level of 0.7 weight percent based on the weight of the ground beef. Patties were made of the separate portions of the resulting flavored ground beef and were fried, and the flavors were evaluated. Similar patties were made using an equal amount of sodium chloride. The results are shown in the following table.

TABLE I

| Hydrochloride Salt of Amino Acid Amide | Taste Evaluation |
|---|---|
| Glycinamide | Less salty than sodium chloride but flavor acceptable |
| Valinamide | Slightly bitter, chemical taste |
| Leucinamide | Very bitter |
| Isoleucinamide | Very bitter |
| Alaninamide | Slightly bitter, chemical taste |
| Prolinamide | Slightly bitter, chemical taste |
| Sodium chloride control | Acceptable salty flavor |

It can be seen from the above data that a mixture of glycinamide hydrochloride and a flavor potentiator has superior saline flavor when compared with mixtures of a flavor potentiator and hydrochlorides of other amino acid amides.

EXAMPLE 7

Separate mixtures of 75 weight percent glycinamide hydrochloride and 25 weight percent, respectively, of monopotassium glutamate, monocalcium glutamate and monomagnesium glutamate were added to raw hamburger meat at a level of 1.0 weight percent based on the weight of the meat. After shaping and frying, all the resulting cooked hamburgers had acceptable tastes with desired saline flavor note.

EXAMPLE 8

Separate portions of a vegetable protein meat analog were prepared containing, respectively, 1.0 weight percent sodium chloride; a mixture of 0.5 weight percent sodium chloride and 0.5 weight percent glycinamide hydrochloride; and a mixture of 0.75 weight percent glycinamide hydrochloride and 0.25 weight percent monosodium glutamate. A 24 member sensory evaluation panel found acceptable flavors including desired saline flavor note for all the products and only non-significant flavor differences between such products.

EXAMPLE 9

A mixture of 20 weight percent glycinamide hydrochloride and 80 weight percent monosodium glutamate was added to raw hamburger meat at a level of 1.0 weight percent based on the weight of the meat. After shaping and frying, the cooked hamburger had an acceptable taste with the desired saline flavor note.

EXAMPLE 10

Glycinamide hydrochloride was added to a vegetable protein meat analog at a level of 1.0 weight percent. A spice mixture was also added. The taste of this analog was similar to that obtained with 1 weight percent sodium chloride and similar spice mixture.

EXAMPLE 11

Separate mixtures were prepared each consisting of 75 weight parts glycinamide hydrochloride, 20 weight parts monopotassium glutamate and 5 weight parts of a single food acidulant. The food acidulants used in the separate mixtures were fumaric acid, glutamic acid, citric acid, malic acid, tartaric acid and adipic acid. Each separate mixture was then added to separate portions of ground beef patties in an amount of 0.7 weight percent based on the weight of the meat. The resulting patties were then fried and evaluated for flavor by a trained taste panel. All patties containing the sodium chloride substitute mixtures had acceptable saline flavor notes as compared to patties containing 0.7 weight percent sodium chloride.

EXAMPLE 12

Separate mixtures were prepared each consisting of 75 weight parts glycinamide hydrochloride, 20 weight parts potassium chloride and 5 weight parts of a single food acidulant. The food acidulants used in the separate mixtures were fumaric acid, glutamic acid, citric acid, malic acid, tartaric acid and adipic acid. Each separate mixture was then added to separate portions of ground beef patties in an amount of 0.7 weight percent based on the weight of the meat. The resulting patties were then fried and evaluated for flavor by a trained taste panel. All patties containing the sodium chloride substitute mixtures had acceptable saline flavor notes as compared to patties containing 0.7 weight percent sodium chloride.

All of the above examples employed glycinamide hydrochloride as the glycinamide salt. The following example shows the utility for other glycinamide salts as sodium chloride substitutes to impart a saline flavor to foods.

EXAMPLE 13

Mixtures respectively of 75 weight parts of one of the glycinamide salts listed in Table II below and 25 weight parts monosodium glutamate were individually added to separate portions of hamburger patties in an amount of 1 weight percent based on the weight of the hamburger. The patties were then fried and the flavors were evaluated. The results are shown in the following table.

TABLE II

| Salt of Glycinamide | Flavor Characterstics |
|---|---|
| Sulfate | Slightly salty |
| Glutamate | Slight to moderate saltiness |
| Citrate (tribasic) | Slightly salty, slightly |

TABLE II-continued

| Salt of Glycinamide | Flavor Characterstics |
| --- | --- |
| | sour |
| Malate (dibasic) | Slight to moderate saltiness |
| Adipate (dibasic) | Slightly salty |
| Tartrate (dibasic) | Slightly salty |
| Fumarate (dibasic) | Slightly salty |
| Fumarate (monobasic) | Slightly salty, slightly sour |
| Phosphate | Slightly salty |

It should be noted that while several of the flavor potentiators employed in combination with the glycinamide salt in the above examples contained sodium, the total amount of sodium in the final flavored foodstuff is significantly reduced when compared to the amount of sodium present when sodium chloride alone is employed to accomplish the same flavor result.

What is claimed is:

1. A sodium chloride substitute composition having a desirable saline flavor consisting essentially of a mixture of from about 20 to about 91 weight percent of a glycinamide salt and from about 9 to about 80 weight percent of a flavor potentiator, said weight percents being based on the total weight of such composition.

2. A composition according to claim 1 wherein the glycinamide salt is glycinamide hydrochloride.

3. A composition according to claim 1 wherein the glycinamide salt is glycinamide glutamate.

4. A composition according to claim 1 wherein the glycinamide salt is glycinamide citrate.

5. A composition according to claim 1 wherein the glycinamide salt is glycinamide malate.

6. A composition according to claim 1 wherein the glycinamide salt is glycinamide tartrate.

7. A composition according to claim 2 wherein the flavor potentiator is monosodium glutamate.

8. A composition according to claim 2 wherein the flavor potentiator is a mixture of a glutamic acid salt and a food acidulant.

9. A sodium chloride substitute composition having a desirable saline flavor consisting essentially of about 75 weight percent glycinamide hydrochloride and about 25 weight percent monosodium glutamate, said weight percents being based on the total weight of such composition.

10. A process of imparting a desirable saline flavor to a foodstuff which comprises adding from about 0.1 to about 4.0 weight percent of glycinamide salt or of the sodium chloride substitute composition of claim 1, based on the weight of the foodstuff.

11. A foodstuff having a desirable saline flavor note and containing, as a sodium chloride substitute, from about 0.1 to about 4.0 weight percent of a glycinamide salt or of the composition of claim 1, based on the weight of the foodstuff.

* * * * *